Sept. 22, 1970     I. ITZKAN ET AL     3,530,398
RAPID ON-OFF SWITCHING OF A C.W. LASER SOURCE
Filed March 14, 1966     2 Sheets-Sheet 1

INVENTORS
IRVING ITZKAN
PETER S. ZORY JR
BY
John H. Gallagher
ATTORNEY

United States Patent Office 3,530,398
Patented Sept. 22, 1970

3,530,398
RAPID ON-OFF SWITCHING OF A C.W. LASER SOURCE
Irving Itzkan, Great Neck, and Peter S. Zory, Jr., Glen Cove, N.Y., assignors to Sperry Rand Corporation, a corporation of Delaware
Filed Mar. 14, 1966, Ser. No. 534,120
Int. Cl. H01s 3/09, 3/10, 3/22
U.S. Cl. 331—94.5
12 Claims

ABSTRACT OF THE DISCLOSURE

Apparatus for rapidly switching a laser on and off comprising a lasing medium characterized by energy levels having population density versus applied energy characteristics such that a population inversion is established therein in response to a first quantity of energy to provide normal lasing action and then disrupted by the application of a sufficient quantity of additional energy whereby the lasing action is abruptly terminated. Conversely, removal of the additional quantity of energy restores the population inversion and enables normal lasing action to resume.

---

This invention relates to a gas laser device and more particularly to the manner of operating a helium-neon gas laser device, for example, to achieve extremely rapid off-and-on switching of the light beam to insert a marker in the beam which will enable the beam to be used for range determination purposes or for communication purposes.

Beams of coherent light from continuously operating (C.W.) laser light sources have been used in moving object detection systems which are optical analogs of mixed-frequency C.W. Doppler radar systems. These optical systems are capable of detecting the presence and the velocity of an object which has motion relative to the detecting system, but by themselves the optical fixed-frequency C.W. systems are incapable of providing information as to the range of a detected target. To obtain range information from a C.W. Doppler optical system it is necessary to provide some discernible reference point or marker on the C.W. laser beam in order that a measurement may be made of the time interval required for that marker to propagate a round trip between the system and the detected object. The marker must have some detectable characteristic which occurs in an extremely short instant of time to assure that precise determination of the beginning and ending of the range-measuring time interval may be made.

In accordance with one example of the present invention, a helium-neon laser light beam at a wavelength of .6328 micron ($\mu$) is abruptly extinguished in a time interval of the order of a microsecond or less, thereby providing the discernible reference marker from which range measurements may be made. The lasing action is reinstituted in a time interval of from ten to fifteen microseconds following the extinguishment of the beam so that the total time that the C.W. beam is interrupted does not interfere with the normal functioning of the C.W. Doppler system. The extremely rapid extingushment of the laser beam is accomplished by applying a current pulse to the steady discharge current of the helium-neon laser so as to preferentially increase the population density of neon atoms in the $2p_4$ energy level relative to the population density of neon atoms in the $3s_2$ higher energy level, thereby to eliminate the population inversion that gives rise to the .6328$\mu$ coherent radiation. The elimination of the population inversion takes place because the population density of the $3s_2$ higher energy level saturates at a relatively fixed level as the discharge current in the laser is increased beyond a given magnitude while the population density of the lower $2p_4$ energy level increases relatively linearly with increasing discharge current, so that with a sufficient increase in discharge current the population density of the lower energy level will exceed that of the higher energy level. The extinguishment of the .6328$\mu$ laser beam by this type of operation is considerably more rapid than that achieved by decreasing the discharge current to depopulate the $3s_2$ higher energy level below that of the $2p_4$ lower energy level.

The present invention will be described by referring to the accompanying drawings wherein.

In describing the present invention, a typical helium-neon laser operating at a wavelength of .6328$\mu$ will be used as an example. In such a device that was operated in accordance with the present invention the gas laser tube was comprised of a glass tube that was 125 cm. long with an inside diameter of 5 mm. The ends of the glass tube were closed by glass Brewster angle windows and the optical cavity end mirrors were external to the tube and adjacent the two Brewster angle windows. The active lasing medium within the tube was a commonly used mixture of helium ($He_3$) and neon ($Ne_{20}$) gases having partial pressures of approximately 0.7 and 0.1 mm. of mercury, respectively. An anode and a cathode were within the tube adjacent its respective ends for establishing a direct current (D.C.) discharge through the active lasing medium to excite the respective gas atoms to the energy levels necessary to produce the lasing action. The principles of operation of a gas laser of this type are well known and will not be described other than to state that the emission of coherent light at the wavelength of .6328$\mu$ is possible because of the existence in the gas of a population inversion between excited neon atoms populating the optically connected $3s_2$ and $2p_4$ energy levels, wherein the coherent light results from the stimulated transition of atoms from the higher to the lower energy level. In this discussion the Paschen notation is used to designate the energy levels of the excited atoms.

Figure 1:
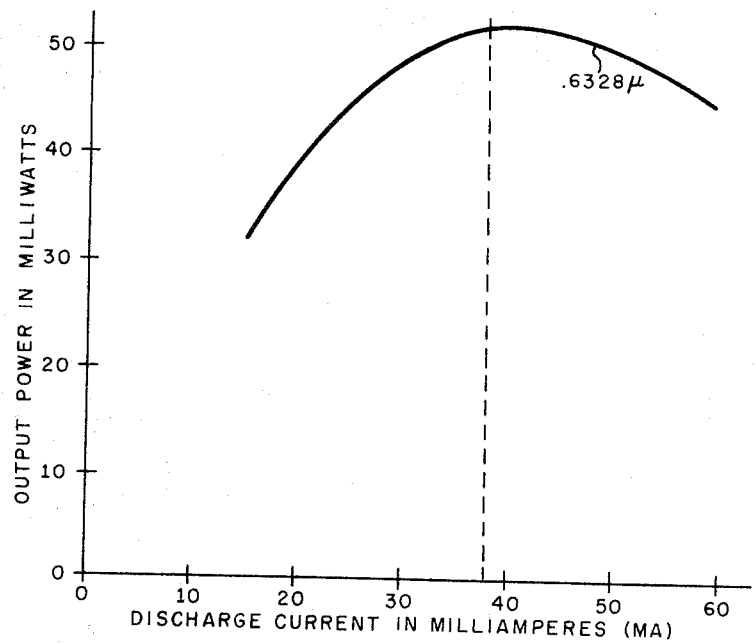
FIGS. 1 and 2 are graphs which illustrate operating characteristics of a helium-neon laser that may be utilized in the practice of the present invention.

In the operation of a typical helium-neon gas laser of the type described above, the intensity of the coherent light beam varies as a function of the discharge current through the tube in a manner illustrated in FIG. 1 wherein it is seen that the output power of the beam, i.e., the light intensity, reaches a maximum at a discharge current of approximately 37 milliamperes and then falls off to lower intensities as the discharge current is further increased. The reason for this variation in the intensity of the laser beam at a wavelength of .6328$\mu$ may be explained by referring to the graphs of FIG. 2 which are plots of the population densities of neon atoms in the $3s_2$ upper energy level and the $2p_4$ lower energy level. It is seen that the population density of the $3s_2$ energy level increases linearly as a function of discharge current up to a value of approximately 50 milliamperes but with further increasing values of discharge current the population density of this energy level begins to saturate and assumes a relatively constant population density. This is due to the fact that the $3s_2$ population density slavishly follows the population density of the He metastable atoms, the metastables having this pronounced density saturation with increasing discharge current. The population density of the lower $2p_4$ energy level on the other hand is substantially a linear function of discharge current for all plotted values of discharge current. It is seen that for a discharge current having a value of approximately 125 milliamperes the two curves intersect, and then for increasing values of discharge current the population density of the $2p_4$ lower energy level exceeds that of the higher $3s_2$ energy level. It is at the crossover point that the population inversion which gives rise to the lasing action is destroyed.

Figure 3:
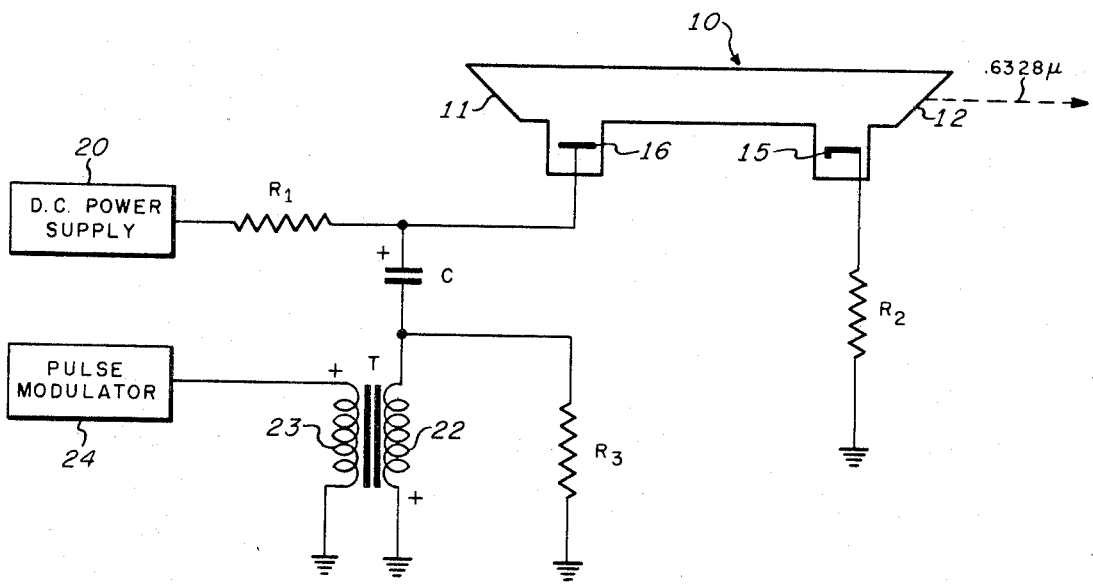
FIG. 3 is a simplified illustration of an electrical circuit that may be employed to practice the present invention.
Figure 4:
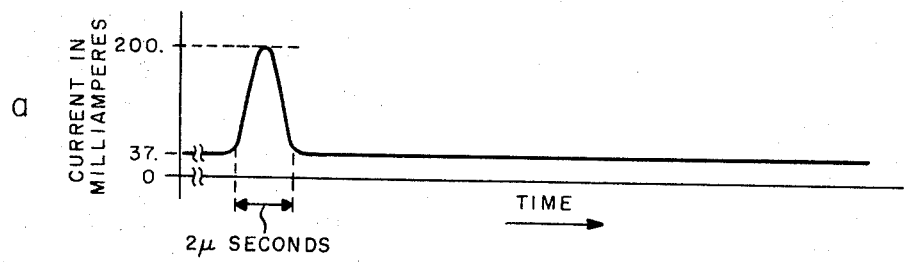
FIGS. 4a and 4b are two curves that are used in explaining the operating characteristics of a laser device that functions in accordance with the teachings of this invention.
Figure 4:
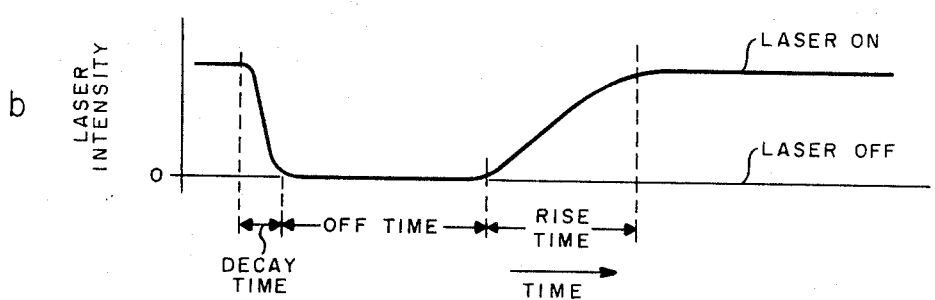

In accordance with the present invention the very abrupt extinguishment of the beam is achieved by applying an additional current pulse to the discharge current of the tube so as to increase the total discharge current beyond that value at which the $2p_4$ lower energy level population curve intersects the $3s_2$ upper energy level population density curve. A suitable circuit arrangement for applying a current pulse to the laser tube is illustrated in FIG. 3 wherein the glass tube 10 which contains the active lasing medium is illustrated as being closed at its two ends by the Brewster angle windows 11 and 12. An electron emissive cathode 15 is disposed adjacent the right end of the tube 10 and an anode 16 is disposed adjacent the opposite end of the table. A D.C. power supply 20 applies a continuous positive potential through resistor $R_1$ to the anode 16, and the cathode 15 is coupled through resistor $R_2$ to ground. The anode 16 of the discharge tube 10 also is coupled through coupling capacitor C to the secondary winding 22 of a pulse transformer T, the other end of the secondary winding 22 being coupled to ground. The primary winding 23 of pulse transformer T is coupled between a pulse modulator 24 and ground. Pulse modulator 24 supplies to the primary winding 23 a positive polarity D.C. current pulse having a sharp leading edge and a short duration of approximately two microseconds, as illustrated in FIG. 4a. This pulse is coupled to the secondary winding 22 of pulse transformer T and travels to ground through two parallel paths, one path being through the resistor $R_3$ and the other path being through coupling capacitor C and through discharge tube 10 and resistor $R_2$ to ground. The modulator voltage is adjusted so that the current pulse added to the steady state current within the discharge tube 10 exceeds the current level at which the population density curves of the two energy levels in FIG. 2 intersect.

The operation of the helium-neon laser in response to this pulse of current is illustrated in FIGS. 4a and 4b wherein it may be seen that with a discharge current of 37 milliamperes prior to the occurrence of the pulse the laser light intensity is at a maximum steady state value. Upon the occurrence of the two microseconds current pulse the laser intensity rapidly decays until the beam is extinguished. Following a short "off time" the intensity of the laser beam begins to rise with a somewhat more gradual slope than that of the "decay time" and then again reaches a steady state value. The very abrupt extinguishment of the beam which occurs during the time period designated "decay time" in FIG. 4b is possible because the increase in population density of the $2p_4$ lower energy level is an extremely rapid process when the applied current pulse has a sharp leading edge. Typical examples of the various time periods designated in FIG. 4b for various magnitudes of current pulses applied to the laser discharge tube are set forth below:

| Current Pulse Magnitude in ma. | Decay time ($\mu$ sec.) | Off time ($\mu$ sec.) | Rise time ($\mu$ sec.) |
|---|---|---|---|
| 200 | 1 | 3 | 7 |
| 300 | 0.8 | 7 | 7 |
| 400 | 0.8 | 8 | 7 |

From the above data it will be noted that the decay time of the laser beam varies but slightly as the magnitude of the current pulse is increased, and this is to be expected since the population density of the $2p_4$ lower energy level is directly related to current, and in the examples given the slopes of the leading edges of the three different current pulses were not vastly different. The "off time" of the laser beam increased as the magnitude of the current pulses increased, and this would be expected because a greater number of neon atoms will be excited to the $2p_4$ level so that a longer time would be expected for the population density to be lowered to the crossover point with the $3s_2$ energy level. The "rise time" is the same for all three examples given above and this too is to be expected because once the crossover point is reached the thermalization process for atoms in the $2p_4$ energy level will be the same for all the examples regardless of the characteristics of the current pulse.

In a practical laser ranging system utilizing a C.W. helium neon laser beam at .6328$\mu$, the leading edge of the current pulse (FIG. 4a) from the pulse modulator 24 of FIG. 3 may be used to initiate the timing period involved in the range measuring operation, and the leading edge of a negative pulse obtained from a photodetector which detects the reflected light beam may be used to terminate the timing period. It may be seen that this type of operation will lead to quite accurate range determination inasmuch as the laser beam will be extinguished in a very short instant of time so that there is little margin for error in the beginning and ending of the range-measuring time interval.

Figure 2:
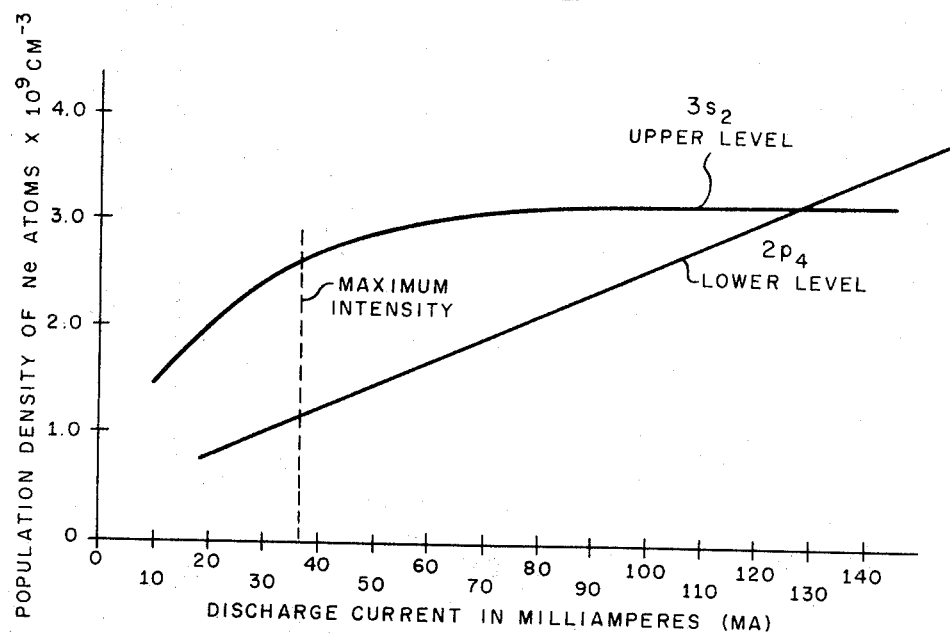

The rapid turn off of the beam by the preferential increase in the population density of the lower $2p_4$ energy level relative to that of the higher $3s_2$ energy level is possible because of the particular nature of the curves of FIG. 2 wherein the lower energy level population density increases linearly with increasing discharge current, while the higher energy level population density saturates. This same type of rapid extinguishment of a laser beam may be employed for other C.W. laser beams whenever the transition between two energy levels involves levels whose population density vs. discharge current characteristics are of the particular nature just described. Other transistions of this type in a helium-neon laser would be the following: $3s_2$–$3p_4$ (3.39$\mu$), and $2s_2$–$2p_4$ (1.1523$\mu$). Additionally, lasers operating at wavelengths in the vicinity of 10.6$\mu$ as a result of the P-branch rotational transitions of the $00°1$–$10°0$ vibrational bands of carbon dioxide ($CO_2$) may be operated in the same manner as described above to obtain the rapid extinguishment of the laser beam. Preferably, these lasers include nitrogen and/or helium gas as additives to the active lasing medium.

In the above examples the atomic excitation is due to energetic electrons which exist in the D.C. discharge occurring between the tube electrodes. Essentially the same type of operation may be obtained when the atomic excitation is due to energetic electrons which exist in a gas discharge created by radio frequency (R.F.) energy. The electric fields of the R.F. accelerate the electrons which collide with and excite the gas atoms. In this instance the preferential increase in population density of neon atoms in the $2p_4$ energy level is achieved by applying additional higher power R.F. energy pulses to the steady R.F. energy that is normally applied to the gas mixture.

What is claimed is:

1. In a laser device that emits coherent light having means for terminating the coherent light emission, the combination comprising
    an active gaseous lasing medium comprised of particles of matter,
    said lasing medium having the characterstic that a population density inversion of energized particles of said matter established between two discrete energy levels in said lasing medium by the application of energy thereto can be destroyed by increasing the applied energy beyond a given quantity, said coherent light resulting from the stimulated transitions of said energized particles from a first energy level to a second lower energy level, first means for applying a first quantity of energy per unit time to said active lasing medium to produce in said first energy level a population density of said energized particles exceeding the population density in said second energy level, and second means for applying to said active lasing medium a second quantity of energy per unit time having a fast rise time and being sufficient to change the population density of the respective energy levels such that the population density of said second energy level becomes greater than that of said first energy level.

2. The combination claimed in which 1 wherein, said first means for applying a first quantity of energy per unit of time to the active lasing medium includes a source of D.C. current for establishing a discharge through said volume of gas.

3. The combination claimed in claim 2 wherein, said second means for applying a second quantity of energy per unit time having a fast rise time to said active lasing medium comprises means for applying an additional current through said volume of gas.

4. The combination claimed in claim 1 wherein said first means for applying a first quantity of energy per unit time to said active lasing medium is a source of radio frequency energy.

5. The combination claimed in claim 4 wherein the means for applying said second quantity of energy per unit time to said active lasing medium comprises means for applying additional radio frequency energy to said active lasing medium.

6. The combination claimed in claim 1 wherein said active lasing medium comprises a volume of carbon dioxide gas.

7. The combination claimed in claim 6 wherein said active lasing medium also includes nitrogen gas.

8. The combination claimed in claim 7 wherein said active lasing medium also includes helium gas.

9. In a laser device that is operative to emit coherent light, means for abruptly terminating the coherent emission for a short interval of time comprising the combination, an active gaseous lasing medium of energized particles of matter for producing emission of coherent light at a given wavelength, said coherent light at a given wavelength resulting from the transition of energized particles from a first energy level to a second lower energy level, means for applying a substantially constant quantity of energy per unit time to said active lasing medium to produce a population density inversion between particles in said first and second energy levels, means for applying to said active lasing medium a short pulse of additional energy of a given magnitude, the population density of particles in said first energy level increasing by a first amount in response to said pulse of additional energy and the population density of particles in said second energy level increasing in response to said pulse of additional energy by a second amount that is greater than said first amount, the magnitude of said pulse of additional energy being proportioned to increase the population density of particles in said second energy level above that of particles in said first energy level whereby a population density inversion between particles in said two energy levels is destroyed.

10. In a helium-neon gas laser device that produces coherent light radiation at a given wavelength the combination comprising, a volume of helium and neon gases serving as an active lasing medium, means for applying a substantially constant quantity of energy per unit time to said volume of gases to produce population density inversion between neon atoms in a first excited energy level and neon atoms in a second optically connected lower energy level.

said two energy levels having population density versus applied energy characteristics in which a population inversion exists between neon atoms in the first and second energy levels for quantities of applied energy per unit time up to a given quantity but said population inversion is destroyed for quantities of applied energy per unit time in excess of said given quantity, means for applying a short pulse of additional energy of a given magnitude to said volume of gases, the magnitude of said short pulse of additional energy being proportioned to increase the population density of neon atoms in the second energy level above that of neon atoms in the first energy level.

11. In a helium-neon gas laser device that produces coherent light radiation at a given wavelength the combination comprising, a volume of helium and neon gases serving as an active lasing medium, means establishing a direct current discharge through said volume of gases, the magnitude of the direct current in said discharge being proportioned to produce coherent light radiation at a given wavelength due to the transition of neon atoms from a first excited energy level to a second lower energy level, said two energy levels having population density versus discharge current characteristics in which a population inversion exists between neon atoms in the first and second energy levels for magnitudes of discharge current up to a given magnitude but said population inversion is destroyed for magnitudes of discharge current in excess of said given magnitude, means for applying a pulse of current to said volume of gas to increase the discharge current therethrough, the magnitude of said current pulse being proportioned to increase the population density of neon atoms in the second energy level above that of neon atoms in the first energy level.

12. The combination claimed in claim 11 wherein said first and second energy levels are respectively the $3s_2$ and $2p_4$ energy levels and the coherent light radiation is at a wavelength of approximately .6328 micron.

References Cited

UNITED STATES PATENTS 3,215,988  11/1965  Clapp _____ 340—173

FOREIGN PATENTS 1,140,075  11/1962  Germany.

OTHER REFERENCES

"Investigation of the Output Power of a Neon-Helium Laser as a Function of Various Parameters," N. Basou et al., Optics & Spectroscopy, XV, 3, September, 1963, pp. 235–6.

"Infrared and Visible Laser Modulation Using Faraday Rotation in YIG," R. Zitter et al., J. Appl. Phys., 37, 3, Mar. 1, 1966, pp. 1089–1090.

"Excitation Mechanisms and Current Dependence of Population Inversion in He–Ne Lasers," White and Gordon, Appl. Phys. Ltrs., 3, 11, Dec. 1, 1963, pp. 197–9.

RONALD L. WIBERT, Primary Examiner

R. J. WEBSTER, Assistant Examiner

U.S. Cl. X.R.

250—199; 356—5